United States Patent
Vedula et al.

(10) Patent No.: US 9,355,260 B2
(45) Date of Patent: May 31, 2016

(54) METHOD AND SYSTEM FOR SECURING ACCESS TO CONFIGURATION INFORMATION STORED IN UNIVERSAL PLUG AND PLAY DATA MODELS

(75) Inventors: Kiran Bharadwaj Vedula, Bangalore (IN); Jong-Hyo Lee, Bangalore (IN)

(73) Assignee: Samsung Electronics Co., Ltd (KR)

( * ) Notice: Subject to any disclaimer, the term of this patent is extended or adjusted under 35 U.S.C. 154(b) by 95 days.

(21) Appl. No.: 13/809,545

(22) PCT Filed: Jul. 11, 2011

(86) PCT No.: PCT/KR2011/005070
§ 371 (c)(1),
(2), (4) Date: Jan. 10, 2013

(87) PCT Pub. No.: WO2012/008721
PCT Pub. Date: Jan. 19, 2012

(65) Prior Publication Data
US 2013/0117866 A1   May 9, 2013

(30) Foreign Application Priority Data

Jul. 10, 2010  (IN) .......................... 1966/CHE/2010

(51) Int. Cl.
*G06F 21/60* (2013.01)
*H04L 12/28* (2006.01)
*H04L 29/06* (2006.01)

(52) U.S. Cl.
CPC .......... *G06F 21/604* (2013.01); *H04L 12/2812* (2013.01); *H04L 63/101* (2013.01); *H04L 12/282* (2013.01); *H04L 12/2809* (2013.01); *H04L 63/104* (2013.01)

(58) Field of Classification Search
CPC ............ H04L 12/2809; H04L 12/2812; H04L 12/282
USPC .......................................................... 726/30
See application file for complete search history.

(56) References Cited

U.S. PATENT DOCUMENTS

| 2002/0133716 | A1* | 9/2002 | Harif | G07C 9/00103 726/9 |
| 2002/0198758 | A1* | 12/2002 | Sawa | G06Q 99/00 709/203 |

(Continued)

OTHER PUBLICATIONS

PCT/ISA/237 Written Opinion issued on PCT/KR2011/005070 (pp. 4).

(Continued)

*Primary Examiner* — Arvin Eskandarnia
(74) *Attorney, Agent, or Firm* — The Farrell Law Firm, P.C.

(57) ABSTRACT

A method and system for securing access to configuration information stored in universal plug and play data models are provided. The method includes receiving a request to operate on at least one node of a data model from a Control Point (CP), where the data model includes a plurality of nodes and each of the plurality of nodes represents configuration information, determining a role associated with the CP, determining whether the role of CP is in a recommended role list, allowing, if the role is present, the CP to operate on the at least one node, and determining, if the role is not present, whether the CP has a role appropriate for operating on the at least one node based on ACL data associated with the at least one node. Accordingly, the CP is allowed to operate on the at least one node or an error message is returned on a display of the CP.

20 Claims, 6 Drawing Sheets

(56) References Cited

U.S. PATENT DOCUMENTS

| | | |
|---|---|---|
| 2005/0138179 A1 | 6/2005 | Encarnacion et al. |
| 2005/0160144 A1* | 7/2005 | Bhatia ............... H04L 51/12 709/206 |
| 2007/0208948 A1 | 9/2007 | Costa-Requena et al. |
| 2007/0214497 A1* | 9/2007 | Montgomery ...... G06F 21/6218 726/4 |
| 2007/0254630 A1 | 11/2007 | Moloney et al. |
| 2008/0022362 A1 | 1/2008 | Hinton et al. |
| 2008/0112405 A1* | 5/2008 | Cholas ................ H04L 63/062 370/389 |
| 2008/0178212 A1* | 7/2008 | Kinoshita .......... H04N 21/4882 725/32 |
| 2010/0049965 A1 | 2/2010 | Han et al. |
| 2010/0095356 A1 | 4/2010 | Han et al. |
| 2010/0216462 A1* | 8/2010 | Aso ..................... H04W 12/08 455/434 |
| 2011/0125799 A1* | 5/2011 | Kandasamy ........ G06F 21/6218 707/785 |

OTHER PUBLICATIONS

PCT/ISA/210 Search Report issued on PCT/KR2011/005070 (pp. 3).

V. Cridlig et al., "Role-Based Access Control for XML Enabled Multi-Protocol Management Gateways", IEEE Transactions on Network and Service Management, Jan. 1, 2006.

Gunter Karjoth et al., "Implementing ACL-based Policies in XACML", 2008 Annual Computer Security Applications Conference, Dec. 8, 2008.

"Universal Plug and Play Device Architecture, UPnP, Version 1.0", Jun. 8, 2000.

* cited by examiner

METHOD AND SYSTEM FOR SECURING ACCESS TO CONFIGURATION INFORMATION STORED IN UNIVERSAL PLUG AND PLAY DATA MODELS

PRIORITY

This application is a U.S. National Phase entry from and claims priority to International Appl. No. PCT/KR2011/005070, filed Jul. 11, 2011, and also claims priority to Appl. No. 1966/CHE/2010, filed with the Indian Patent Office on Jul. 10, 2010, the entire contents of each of which are incorporated herein by reference.

BACKGROUND OF THE INVENTION

1. Field of the Invention

The present invention relates generally to the Universal Plug and Play (UPnP) home network system, and more particularly relates to a method and system for accessing of UPnP device management data models.

2. Description of the Related Art

Universal Plug and Play (UPnP) is a set of computer network protocols promulgated by the UPnP forum. The goals of UPnP are to allow access to connect devices together seamlessly and to simplify the implementation of networks in home environments (e.g., data sharing, communications, and entertainment environments) and corporate environments. These goals are achieved by defining and publishing UPnP device control protocols built upon open, Internet-based communication standards.

The UPnP technology can cater to a wide range of devices in a home network. The UPnP technology provides discovery, control and eventing mechanisms. Discovery is enabled using Simple Service Discovery Protocol (SSDP). Eventing follows General Event Notification Architecture (GENA) protocol. Using these technologies, UPnP sets UPnP devices as available and unavailable to the other devices in the UPnP home network, on the fly.

UPnP architecture allows peer-to-peer networking of Personal Computers (PCs), networked appliances, and wireless devices. UPnP architecture is also a distributed, open architecture based on established standards such as Transmission Control Protocol (TCP)/Internet Protocol (IP), User Datagram Protocol (UDP), HyperText Transfer Protocol (HTTP) and eXtensible Markup Language (XML).

The UPnP architecture supports zero configuration networking. For example, a UPnP compatible device from any vendor can dynamically join a network, obtain an IP address, announce its name, convey its capabilities upon request, and learn about the presence and capabilities about other devices. UPnP devices can also automatically leave the UPnP home network without leaving any unwanted state information.

The foundation for UPnP networking is IP addressing. Each UPnP device includes a Dynamic Host Configuration Protocol (DHCP) client that searches for a DHCP server when the UPnP device is first connected to the UPnP network. If no DHCP server is available, the UPnP device assigns itself an address. If during the DHCP transaction, the UPnP device obtains a domain name, for example, through a Domain Name System (DNS) server or via DNS forwarding, the UPnP device uses that name in subsequent network operations; otherwise the UPnP device uses its IP address.

UPnP defines a device protection service as a generic security solution that can be used by all services defined in the UPnP. Device protection service defines concept of roles of control points and/or control devices. All control points or control devices are assigned different roles (i.e., public, basic, and admin) for performing UPnP actions. Different DHCPs and Vendors are free to extend these sets of roles.

The UPnP device management service defines a concept of data models. A UPnP data model is a tree representation of various device and service configuration related information. The terms "UPnP data model" and "data model" are used interchangeably herein. Such data models include various kinds of nodes such as leaf nodes, single instance nodes, multi-instance nodes and instance nodes. Data models may contain sensitive information that must be protected. Also, some of the configuration information stored in the data models may be irrelevant to some of the control points or users in home network environment. Current device protection services provide complete configuration information stored in the data models to a control point when requested. As a consequence, the control point obtains access to sensitive and irrelevant information provided in the complete configuration information.

Therefore, there exists a need for a way to provide access control for viewing, reading, and modifying configuration information stored in UPnP device management data models, thereby providing protection to configuration information stored in the data models.

SUMMARY OF THE INVENTION

Accordingly, the present invention is designed to address at least the problems and/or disadvantages described above, and to provide at least the advantages described below. An aspect of the present invention is to provide a method and system for securing access to configuration information stored in UPnP data models.

According to an aspect of the present invention, a computer-implemented method for securing access to configuration information stored in data models in a home network environment having at least one control point and at least one control device is provided. The method includes receiving, from a control point, a request to operate on at least one node of a data model, wherein the data model includes a plurality of nodes, where each of the plurality of nodes represents configuration information; determining a role associated with the control point based on the received request; determining whether the role associated with the control point is in a recommended role list associated with the received request; allowing, if the role associated with the control point is in the recommended role list associated with the received request, the control point to operate on the at least one node of the data model; determining, if the role associated with the control point is not in the recommended role list associated with the received request, whether the control point has a role appropriate for operating with respect to the at least one node of the data model based on Access Control List (ACL) data associated with each of the at least one node; allowing, if the control point has a role appropriate for operating with respect to the at least one node of the data model based on the ACL data associated with each of the at least one node, the control point to operate on the at least one node of the data model; and returning, if the control point does not have a role appropriate for operating with respect to the at least one node of the data model based on the ACL data associated with each of the at least one node, an error message on a display of the control point.

According to another aspect of the present invention an apparatus is provided. The apparatus includes a processor; memory coupled to the processor; a Configuration Management Service (CMS) module included within the processor for receiving, from a control point, a request to operate on at least one node of a data model, wherein the data model includes a plurality of nodes, where each of the plurality of nodes represents configuration information, determining a role associated with the control point based on the received request, determining whether the role associated with the control point is in a recommended role list associated with the received request, allowing, if the role associated with the control point is in the recommended role list associated with the received request, the control point to operate on the at least one node of the data model, determining, if the role associated with the control point is not in the recommended role list associated with the received request, whether the control point has a role appropriate for operating with respect to the at least one node of the data model based on Access Control List (ACL) data associated with each of the at least one node, allowing, if the control point has a role appropriate for operating with respect to the at least one node of the data model based on the ACL data associated with each of the at least one node, the control point to operate on the at least one node of the data model, and returning, if the control point does not have a role appropriate for operating with respect to the at least one node of the data model based on the ACL data associated with each of the at least one node, an error message on a display of the control point.

According to another aspect of the present invention, a non-transitory computer-readable storage medium is provided. The non-transitory computer-readable storage medium has instruction stored therein, that when executed by a control device of a home network environment, causes the control device to perform a method that includes receiving, from a control point, a request to operate on at least one node of a data model, wherein the data model includes a plurality of nodes, where each of the plurality of nodes represents configuration information; determining a role associated with the control point based on the received request; determining whether the role associated with the control point is in a recommended role list associated with the received request; allowing, if the role associated with the control point is in the recommended role list associated with the received request, the control point to operate on the at least one node of the data model; determining, if the role associated with the control point is not in the recommended role list associated with the received request, whether the control point has a role appropriate for operating with respect to the at least one node of the data model based on Access Control List (ACL) data associated with each of the at least one node; allowing, if the control point has a role appropriate for operating with respect to the at least one node of the data model based on the ACL data associated with each of the at least one node, the control point to operate on the at least one node of the data model; and returning, if the control point does not have a role appropriate for operating with respect to the at least one node of the data model based on the ACL data associated with each of the at least one node, an error message on a display of the control point.

According to another aspect of the present invention, a home network system is provided. The home network system includes at least one control point for invoking a request to operate on one or more nodes of a data model, wherein the data model comprises a plurality of nodes, each of the plurality of nodes representing configuration information; and at least one control device communicatively coupled to the at least one control point for determining a role associated with the at least one control point based on the received request, determining whether the role associated with the at least one control point is in a recommended role list associated with the received request, allowing, if the role associated with the at least one control point is in the recommended role list associated with the received request, the at least one control point to operate on the at least one node of the data model, determining, if the role associated with the at least one control point is not in the recommended role list associated with the received request, whether the at least one control point has a role appropriate for operating with respect to the at least one node of the data model based on Access Control List (ACL) data associated with each of the at least one node, allowing, if the at least one control point has a role appropriate for operating with respect to the at least one node of the data model based on the ACL data associated with each of the at least one node, the at least one control point to operate on the at least one node of the data model, and returning, if the at least one control point does not have a role appropriate for operating with respect to the at least one node of the data model based on the ACL data associated with each of the at least one node, an error message on a display of the at least one control point.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Embodiments of the present invention are described in detail as follows with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The drawings described herein are for illustration purposes only and are not intended to limit the scope of the present invention in any way.

Figure 1:
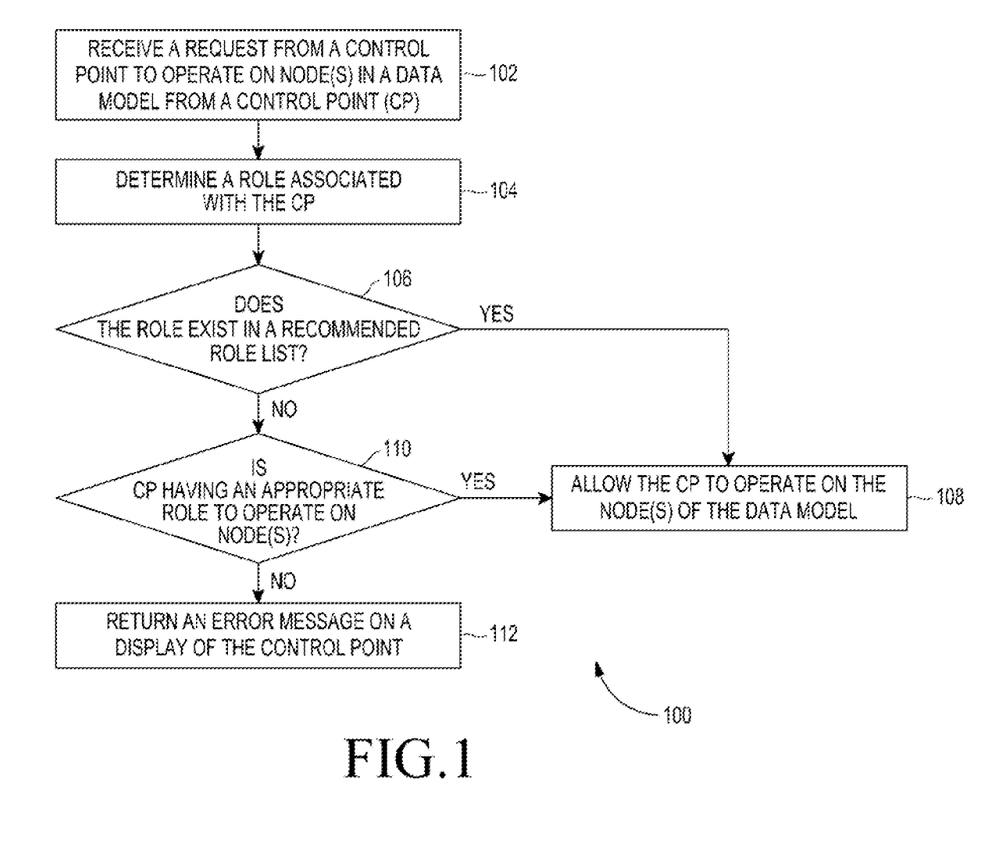
FIG. 1 is a process flow chart illustrating a method of providing secured access to configuration information stored in universal plug and play (UPnP) data models, according to an embodiment of the present invention.

FIG. 1 is a process flow chart illustrating a method of providing secured access to configuration information stored in UPnP data models, according to an embodiment of the present invention.

Referring to FIG. 1, step 102 of the flow chart 100, a request to operate on node(s) of a data model is received from a control point in a home network environment. A data model includes a plurality of nodes, such as leaf nodes, single instance nodes, multi-instance nodes, and instance nodes. Each of the plurality of nodes stores configuration information associated with control points in the home network environment. The configuration information may be a service configuration information and device configuration information.

Figure 2:
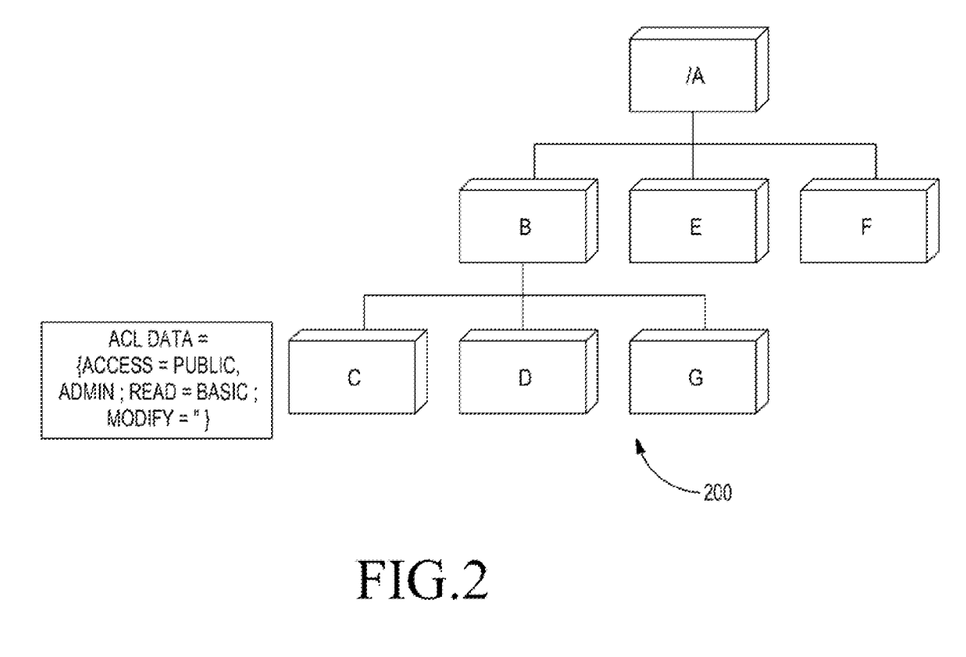
FIG. 2 is a schematic diagram illustrating a UPnP data model having multiple nodes, an embodiment of the present invention.

FIG. 2 is a schematic diagram illustrating a UPnP data model having multiple nodes, according to an embodiment of the present invention.

Referring to FIG. 2, a data model 200 is shown and includes node /A/B, node /A/E, node /A/F, node /A/B/C, node /A/B/D, and node /A/B/G to store configuration information. The control point may request to operate on any of the nodes of the data model.

Referring back to FIG. 1, at step 104, a role associated with the control point is determined based on the request received at step 102. Each of the control points in the home network environment is assigned a role to operate on the associated configuration information. For example, the control point associated with the request may be assigned a public role, a basic role, or an admin role. It can be noted that, any other type of roles such as vendor specified roles may be assigned to the control point.

At step 106, it is determined whether the role assigned to the control point is in a recommended role list associated with the operation (e.g., access, read, or modify) specified in the request. The recommended role list includes a list of roles associated with control points in the home network environment recommended for performing access, read, and modify operations on the nodes of the data model. If the role is in the recommended role list, then at step 108, the control point is allowed to operate on the node(s) of the data model.

For example, if, at step 102, the control point has requested to access the node /A/B/C of the data model 200, then the control device allows the control point to access the node /A/B/C based on the recommended role list. If the request is associated with read operation, then the control device allows the control point to read the configuration information stored in the node /A/B/C of the data model 200. Alternatively, if the control point requests a modify operation, then the control device allows the control point to modify the node /A/B/C (e.g., add another node, or remove a node). In some embodiments of the present invention, only associated node(s) of the data model are displayed on the display of the control point. In these embodiments, remaining nodes (i.e., nodes other than the requested nodes) of the data model are not displayed on the display of the control point.

Upon a determination that the role is not in the recommended role list at step 106, then at step 110, it is determined whether the control point is having an appropriate role to operate on the node(s) of the data model. In one example according to an embodiment of the present invention, the determination is made using Access Control List (ACL) data associated with requested node(s) of the data model. It can be noted that ACL data is a node property. ACL data associated with a node includes a node identifier being associated with an access element, a read element, and/or a modify element. The access element, read element, and modify element indicates a role type that is authorized to perform each of access, read, and modify operations on the node associated with the corresponding node identifier. ACL data of each node along with the corresponding node identifier is illustrated in Table 1 below.

TABLE 1

| NODE IDENTIFIER | ACL DATA |
|---|---|
| /A/B/C | ACCESS=PUBLIC, ADMIN; READ=BASIC; MODIFY=" |
| /A/B | ACCESS=BASIC; READ=ADMIN; MODIFY=ADMIN |
| /A/B/D | ACCESS=PUBLIC, READ=BASIC; MODIFY=ADMIN |

With reference to FIG. 2 and Table 1, the control point having a public role is permitted to access the node with node identifier /A/B/C, while the control point having a basic role is allowed to read the node with node identifier /A/B/C. However, no role is authorized to modify the node with node identifier /A/B/C. The control point having a basic role is permitted to access the node with node identifier /A/B, and the control point having an admin role is allowed to read and/or modify the node with node identifier /A/B. Similarly, the control point having a public role is permitted to access the node with node identifier /A/B/D, the control point having a basic role is allowed to read the node with node identifier /A/B/D, and the control point having an admin role is allowed to modify the node with node identifier /A/B/D. Three examples of XML schemas of the ACL data for the node identifiers /A/B/C, /A/B, and /A/B/D according to embodiments of the present invention are provided as follows.

FIRST XML SCHEMA

<ACLData>
    <NodeIdentifier> /A/B/C </NodeIdentifier>
    <Access> Public </Access>
    <Read> Basic </Read>
    <Modify> None </Modify>
  <ACLData>

SECOND XL SCHEMA

<ACLData>
    <NodeIdentifier> /A/B </NodeIdentifier>
    <Access> Public </Access>
    <Read> Admin </Read>
    <Modify> Admin </Modify>
  <ACLData>

THIRD XML SCHEMA

<ACLData>
    <NodeIdentifier> /A/B/D </NodeIdentifier>
    <Access> Public </Access>
    <Read> Basic </Read>
    <Modify> Admin </Modify>
  <ACLData>

Referring back to FIG. 1, the determination as to whether the control point will be allowed to operate on node(s) based on ACL data of the node(s) is performed as follows. At first, a node identifier associated with a node indicated in the request is determined. Then, ACL data associated with the node for which an operation is requested is retrieved. Further, it is determined whether the role associated with the control point matches a role authorized to perform requested operation on the node in the ACL data. If match is found, it is determined whether there is any other node for which a request to operate is made. If there are any nodes left, the above steps are repeated until all of the nodes are processed. If there are not any nodes left for processing and a match is found for all node(s) requested, then step 108 is performed. If no match is found in one or more node(s) requested, then an error message is returned on the display of the control point, at step 112.

For example, consider a case where the control point has requested a read operation on a node /A/B/D and a role associated with the control point is public role. As per Table 1, the ACL data associated with the node /A/B/D indicates "Access=Public, Read=Basic, and Modify=Admin". Therefore, an error message is returned denying read operation on the node /A/B/D. However, if the control point requests an access operation on the node /A/B/D, then the control point is allowed to perform an access operation on the node /A/B/D as the access element indicates a public role for the node /A/B/D in the Table 1.

Figure 3:
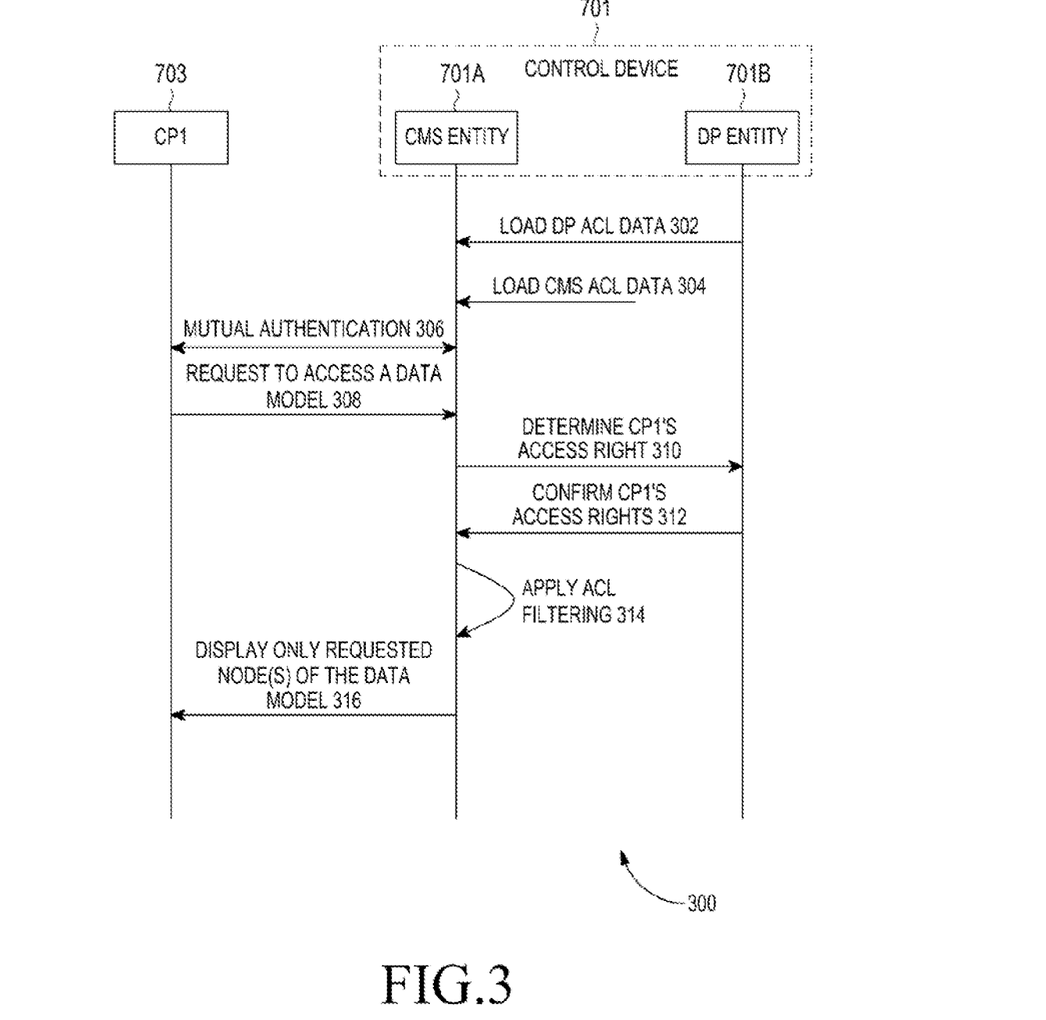
FIG. 3 is a flow diagram illustrating a method of securing access to configuration information of a data model, according to an embodiment of the present invention.

FIG. 3 is a flow diagram illustrating a method of securing access to configuration information of a data model, according to an embodiment of the present invention.

Referring to FIG. 3, a control device 701 includes a Configuration Management Service (CMS) entity 701a and a Device Protection (DP) entity 701b that communicates with a first control point CP1 703. At step 302 of flow diagram 300, the DP entity 701b provides ACL data associated with a DP service to the CMS entity 701b. At step 304, the CMS entity 701a is loaded with CMS ACL data through an out-of-band channel. At step 306, the CMS entity 701a and the CP1 703 are mutually authenticated. At step 308, the CP1 703 sends a request to access a data model to the CMS entity 701a.

At step 310, the CMS entity 701a checks with the DP entity 701b to determine whether the CP1 703 has a right to access the data model. The DP entity 701b determines whether the role of the CP1 703 is present in the recommended role list. In the present example, the DP entity 701b finds that CP1 703 does not have right to access the data model. At step 312, the DP entity 701b confirms that CP1 703 does not have right to access the data model. At step 314, the CMS entity 701a determines whether the CP1 has an appropriate role for accessing requested node(s) of the data model and finds that the CP1 703 has permission to access the node(s). Accordingly, at step 316, the CMS entity 701a returns the data model with only the requested node(s) to the CP1 703 while hiding the remaining nodes from the CP1 703.

Figure 4:
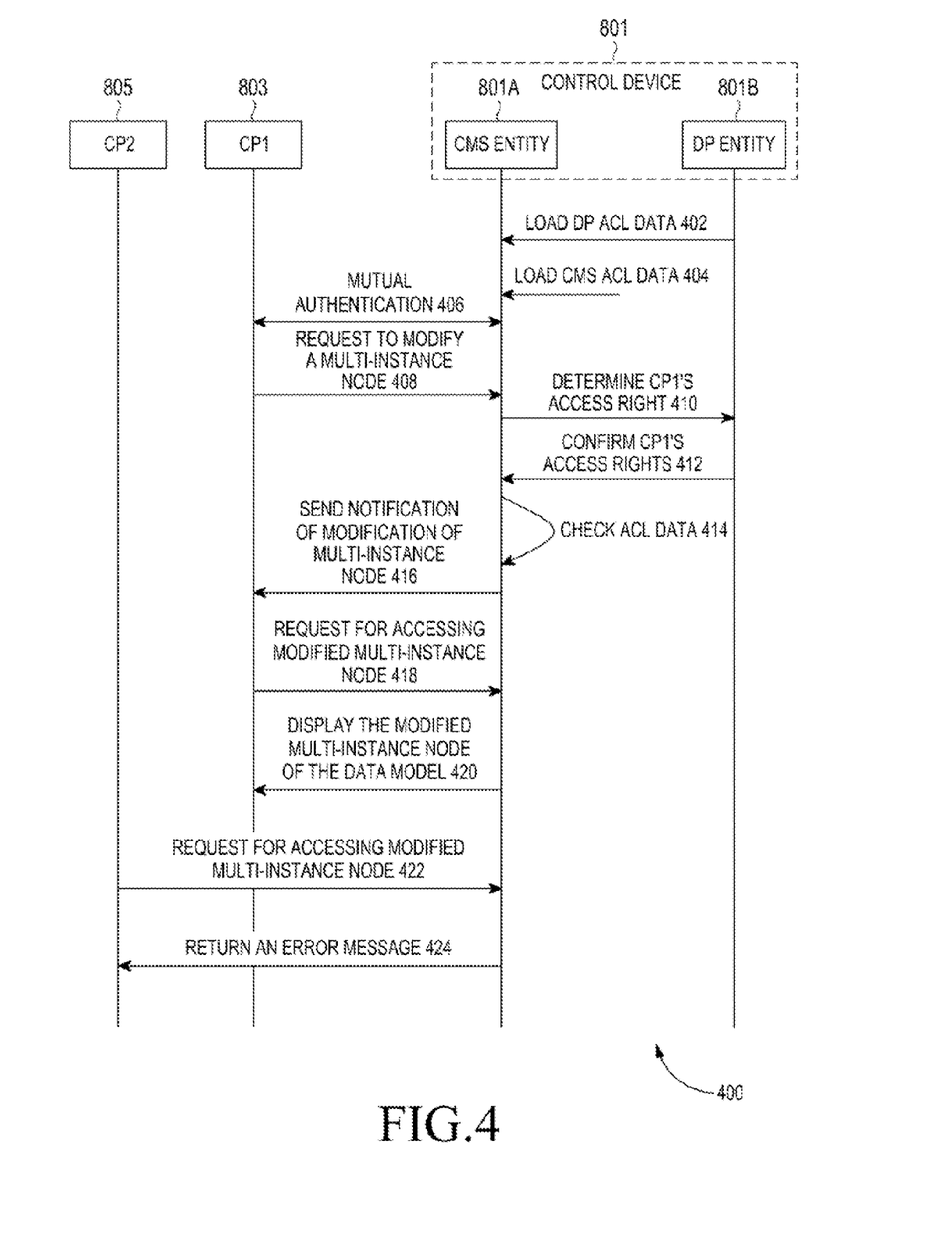
FIG. 4 is a flow diagram illustrating a method of modifying a multi-instance node of a data model by a control point and securing the modified multi-instance node from another control point, according to an embodiment of the present invention.

FIG. 4 is a flow diagram illustrating a method of modifying a multi-instance node of a data model by a control point and securing the modified multi-instance node from another control point, according to an embodiment of the present invention.

Referring to FIG. 4, a control device 801, which includes a CMS entity 801a and a DP entity 801b, communicates with a first control point CP1 803 and a second control point CP2 805. At step 402 of flow diagram 400, the DP entity 801b provides ACL data associated with a DP service to the CMS entity 801a. At step 404, the CMS entity 801a is loaded with CMS ACL data through out-of-band channel. At step 406, the CMS entity 801a and the CP1 803 are mutually authenticated. At step 408, the CP1 803 sends a request to modify a multi-instance node of a data model to the CMS entity 801a.

At step 410, the CMS entity 801a checks with the DP entity 801b to determine whether the CP1 has an access right to modify the multi-instance node of the data model. The DP entity 801b determines whether the role of the CP1 803 is present in the recommended role list. The DP entity 801b determines that CP1 803 does not have an access right to modify the multi-instance node of the data model. At step 412, the DP entity 801b confirms that CP1 803 does not have the access right to modify the multi-instance node of the data model. At step 414, the CMS entity 801a determines whether the CP1 803 has an appropriate role for modifying the multi-instance node of the data model based on CMS ACL data, and finds that the CP1 803 has an appropriate role for modifying the multi-instance node. Accordingly, at step 416, the CMS entity 801a notifies the CP1 803 that the multi-instance node is successfully modified.

At step 418, the CP1 803 requests the CMS entity 801a to view the modified multi-instance node of the data model. At step 420, the CMS entity 801a displays the modified multi-instance node of the data model to the CP1 803. Now, the second control point CP2 805 tries to access the modified multi-instance node of the data model and sends a request to the CMS entity 801a, at step 422. At step 424, the CMS entity 801a returns an error message to the CP2 805, as the CP2 805 does not have a matching role for reading the configuration information in the modified multi-instance node. For example, the CMS entity 801a defines a multi-instance node called "/UPnP/DM/DeviceInfo/PhysicalDevice/NetworkInterface/#/" and the CP1 803 is allowed to invoke a modify command on the multi-instance node to create NetworkInterface1. However, the CP2 805 is not allowed to read the configuration information related to newly created network interface based on the ACL data of the multi-instance node.

Figure 5:
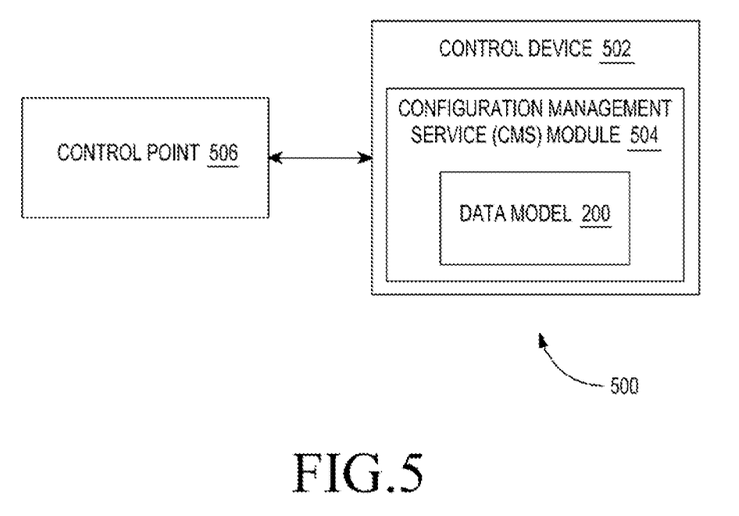
FIG. 5 is a block diagram illustrating a home network system for securing access to configuration information stored in a UPnP data model, according an embodiment of the present invention.

FIG. 5 is a block diagram illustrating a home network system for securing access to configuration information stored in a UPnP data model, according to an embodiment of the present invention.

Referring to FIG. 5, the home network system 500 includes a control device 502 and a control point 506. According to the present invention, the control device 502 includes a CMS module 504 having the data model 200.

In an operation according to an embodiment of the present invention, the control point 506 invokes a request to operate on a node(s) of the data model 200 associated with a configuration management service. The CMS module 504 determines a role associated with the control point 506 based on the request. The CMS module 504 determines whether the role associated with the control point 506 is in a recommended role list. If the role is in the recommended role list, then the CMS module 504 allows the control point 506 to access/read/modify the node(s) of the data model 200. If the role is not present in the recommended role list, the CMS module 504 determines whether the control point 506 has an appropriate role for operating on the node(s) of the data model 200 based on ACL data of the node(s). Based on the determination, the CMS module 504 either allows the control point 506 to access/read/modify the node(s) of the data model 200 or returns an error message to the control point 506. The CMS module 504 secures access to configuration information stored in an UPnP data model in accordance with embodiments of the present invention, such as one or more of the embodiments illustrated in and described with reference to FIGS. 1-4.

Figure 6:
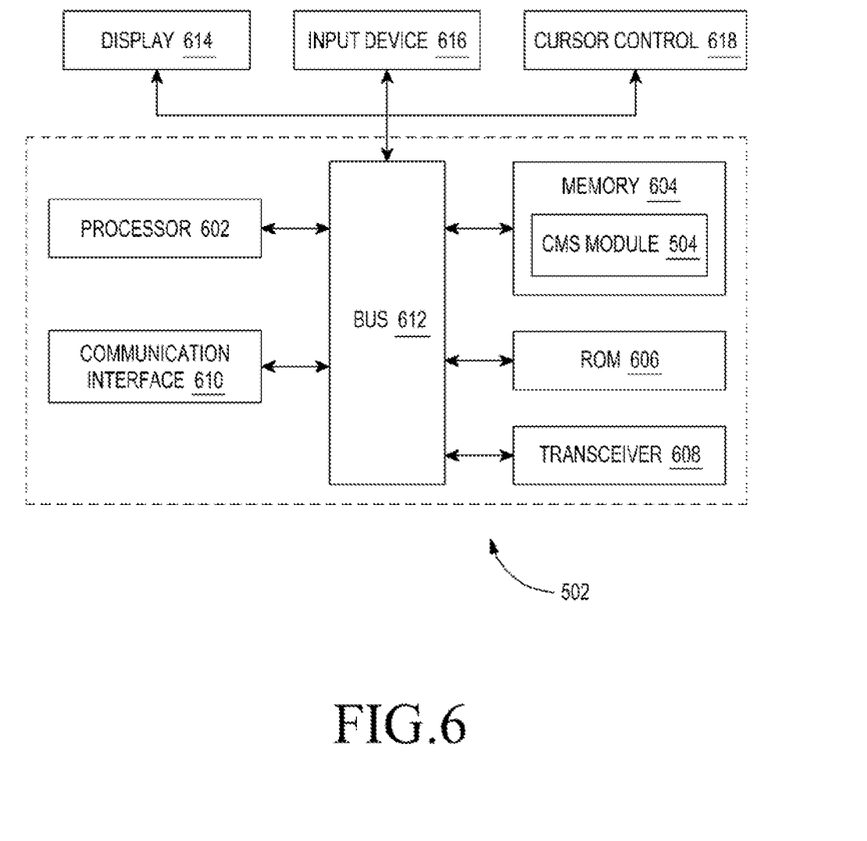
FIG. 6 is a block diagram illustrating various components of the control device of the home network system such as those shown in FIG. 5, according to an embodiment of the present invention.

FIG. 6 is a block diagram illustrating various components of a control device of a home network system, such as those shown in FIG. 5, according to an embodiment of the present invention.

Referring to FIG. 6, the control device 502 includes a processor 602, memory 604, a Read-Only Memory (ROM) 606, a transceiver 608, a bus 610, a communication interface 612, a display 614, an input device 616, and a cursor control 618.

The processor 602, may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 602 may also include embedded controllers, such as generic or programmable logic devices or arrays, application specific integrated circuits, single-chip computers, smart cards, etc.

The memory 604 and the ROM 606 may be volatile memory and non-volatile memory. The memory 604 includes the CMS module 504 for securing access to configuration information stored in an UPnP data model, according to embodiments of the present invention, such as one or more embodiments illustrated in and described with reference to FIGS. 1 through 5. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, etc.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 602. For example, a computer program may include machine-readable instructions capable of securing access to configuration information stored in an UPnP data model, according to the teachings and herein described embodiments of the present subject matter. In one embodiment, the program may be included on a Compact Disc Read-Only Memory (CD-ROM) and loaded from the CD-ROM to a hard drive in the non-volatile memory. The machine-readable instructions may cause the control device 502 to encode according to the various embodiments of the present subject matter.

The transceiver 608 is capable of receiving a request to operate on a node(s) of a data model and authorizing the control point 506 to operate on the node(s) of the data model based on the role of the control point 506 and ACS data of the node(s). The bus 610 interconnects between various components of the control device 502. The components such as communication interfaces 612, the display 614, the input device 616, and the cursor control 618 are well known to the person skilled in the art and therefore, a further explanation of these components is omitted to avoid obscuring the subject matter of the present invention.

As described above, according to embodiments of the present invention, it is possible to provide access control for viewing, reading, as well as modifying configuration information stored in UPnP device management data models, thereby providing protection to configuration information stored in the data models.

Although embodiments of the present invention have been described with reference to specific example embodiments; it will be evident that various modifications and changes may be made to these embodiments without departing from the broader spirit and scope of the various embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit. Thus, it will be apparent to those ordinary skilled in the art that the invention is not limited to the embodiments described, and can encompass not only the appended claims but also their equivalents.

The invention claimed is:

1. A method for securing access to configuration information stored in data models in a network environment, the method comprising:
   receiving, from a control point, a request to operate on at least one node of a data model;
   determining a role associated with the control point based on the received request;
   determining whether the role associated with the control point is in a recommended role list associated with the received request and then determining whether to allow the control point to operate on the at least one node of the data model;
   allowing, if the role associated with the control point is in the recommended role list associated with the received request, the control point to operate on the at least one node of the data model;
   determining, if the role associated with the control point is not in the recommended role list associated with the received request, whether the control point has a role appropriate for operating with respect to the at least one node of the data model based on Access Control List (ACL) data associated with each of the at least one node; and
   allowing, if the control point has a role appropriate for operating with respect to the at least one node of the data model based on the ACL data associated with each of the at least one node, the control point to operate on the at least one node of the data model.

2. The method of claim 1, wherein the request to operate on the data model includes a request to perform one operation selected from a group including an access operation, a modify operation, and a read operation on the data model.

3. The method of claim 1, wherein the at least one node includes leaf nodes, single instance nodes, multi-instance nodes, and instance nodes.

4. The method of claim 1, wherein the role associated with the control point is one role selected from a group including a basic role, a public role, an admin role, and a vendor defined role.

5. The method of claim 1, further comprising:
   returning, if the control point does not have a role appropriate for operating with respect to the at least one node of the data model based on the ACL data associated with each of the at least one node, an error message on a display of the control point.

6. The method of claim 1, wherein the ACL data associated with each of the at least one node includes a node identifier that is associated with an access element, a read element, and a modify element.

7. The method of claim 1, wherein the request to operate on the data model includes a request to perform an access operation on the data model, and
   wherein allowing the control point to operate on the at least one node of the data model comprises enabling the control point to access configuration information stored in the at least one node of the data model.

8. The method of claim 1, wherein the request to operate on the data model includes a request to perform a read operation on the data model, and
   wherein allowing the control point to operate on the at least one node of the data model comprises enabling the control point to read at least one node associated with the at least one node of the data model.

9. The method of claim 1, wherein the request to operate on the data model includes a request to perform a modify operation on the data model, and
wherein allowing the control point to operate on the at least one node of the data model comprises enabling the control point to modify at least one node associated with the at least one node of the data model.

10. The method of claim 1, wherein determining whether the control point has a role appropriate for operating with respect to the at least one node of the data model based on the ACL data associated with each of the at least one node comprises:
(a) determining a node identifier associated with a node of the data model in the received request;
(b) retrieving the ACL data associated with the node of the data model based on the node identifier;
(c) determining whether the role associated with the control point matches with a role authorized to perform the requested operation on the node in the ACL data;
(d) determining, if the role associated with the control point matches with a role authorized to perform the requested operation on the node in the ACL data whether there is any other node left in the received request;
repeating, if there is another node left in the received requested, the above steps (a), (b), (c), and (d) until all of the nodes are processed; and
allowing, if there is not another node left in the received request, the control point to operate on at least one node of the data model.

11. The method of claim 10, wherein determining whether the role associated with the control point matches with any role in the ACL data associated with the node comprises returning, if the role associated with the control point does not match with any role in the ACL data associated with the node, an error message on the display of the control point.

12. An apparatus comprising:
a processor;
transceiver; and
a Configuration Management Service (CMS) module included within the processor for receiving through the transceiver, from a control point, a request to operate on at least one node of a data model, determining a role associated with the control point based on the received request, and determining whether the role associated with the control point is in a recommended role list associated with the received request and then determining whether to allow the control point to operate on the at least one node of the data model,
wherein the CMS module allows, if the role associated with the control point is in the recommended role list associated with the received request, the control point to operate on the at least one node of the data model, and
wherein the CMS module determines, if the role associated with the control point is not in the recommended role list associated with the received request, whether the control point has a role appropriate for operating with respect to the at least one node of the data model based on Access Control List (ACL) data associated with each of the at least one node, and allows, if the control point has a role appropriate for operating with respect to the at least one node of the data model based on the ACL data associated with each of the at least one node, the control point to operate on the at least one node of the data model.

13. The apparatus of claim 12, wherein the request to operate on the data model includes a request to perform one operation selected from a group including an access operation, a modify operation, and a read operation on the data model.

14. The apparatus of claim 12, wherein the at least one node includes leaf nodes, single instance nodes, multi-instance nodes, and instance nodes.

15. The apparatus of claim 12, wherein the role associated with the control point is one role selected from a group including a basic role, a public role, an admin role, and a vendor defined role.

16. The apparatus of claim 12, wherein the CMS module returns, if the control point does not have a role appropriate for operating with respect to the at least one node of the data model based on the ACL data associated with each of the at least one node, an error message on a display of the control point.

17. The apparatus of claim 12, wherein the ACL data associated with each of the at least one node includes a node identifier that is associated with an access element, a read element, and a modify element.

18. The apparatus of claim 12, wherein in allowing the control point to operate on the at least one node of the data model, the CMS module enables the control point to access configuration information stored in the at least one of the data model.

19. The apparatus of claim 12, wherein in allowing the control point to operate on the at least one node of the data model, the CMS module enables the control point to read at least one node associated with the at least one node of the data model.

20. The apparatus of claim 12, wherein in allowing the control point to operate on the at least one of the data model, the CMS module enables the control point to modify at least one node associated with the at least one of the data model.

* * * * *